G. LEICHNAM.
COAL CUTTING MACHINE.
APPLICATION FILED JUNE 14, 1906.

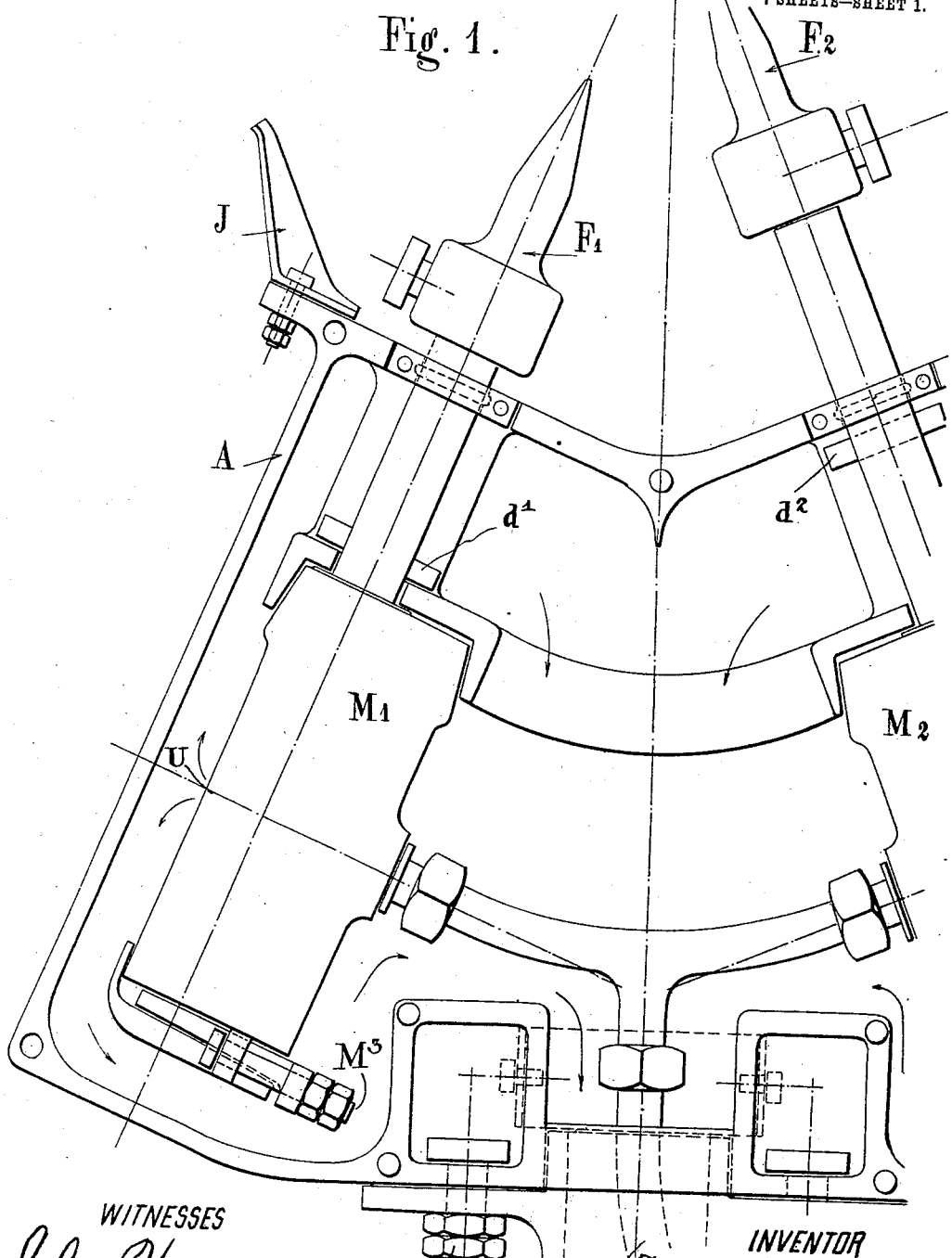

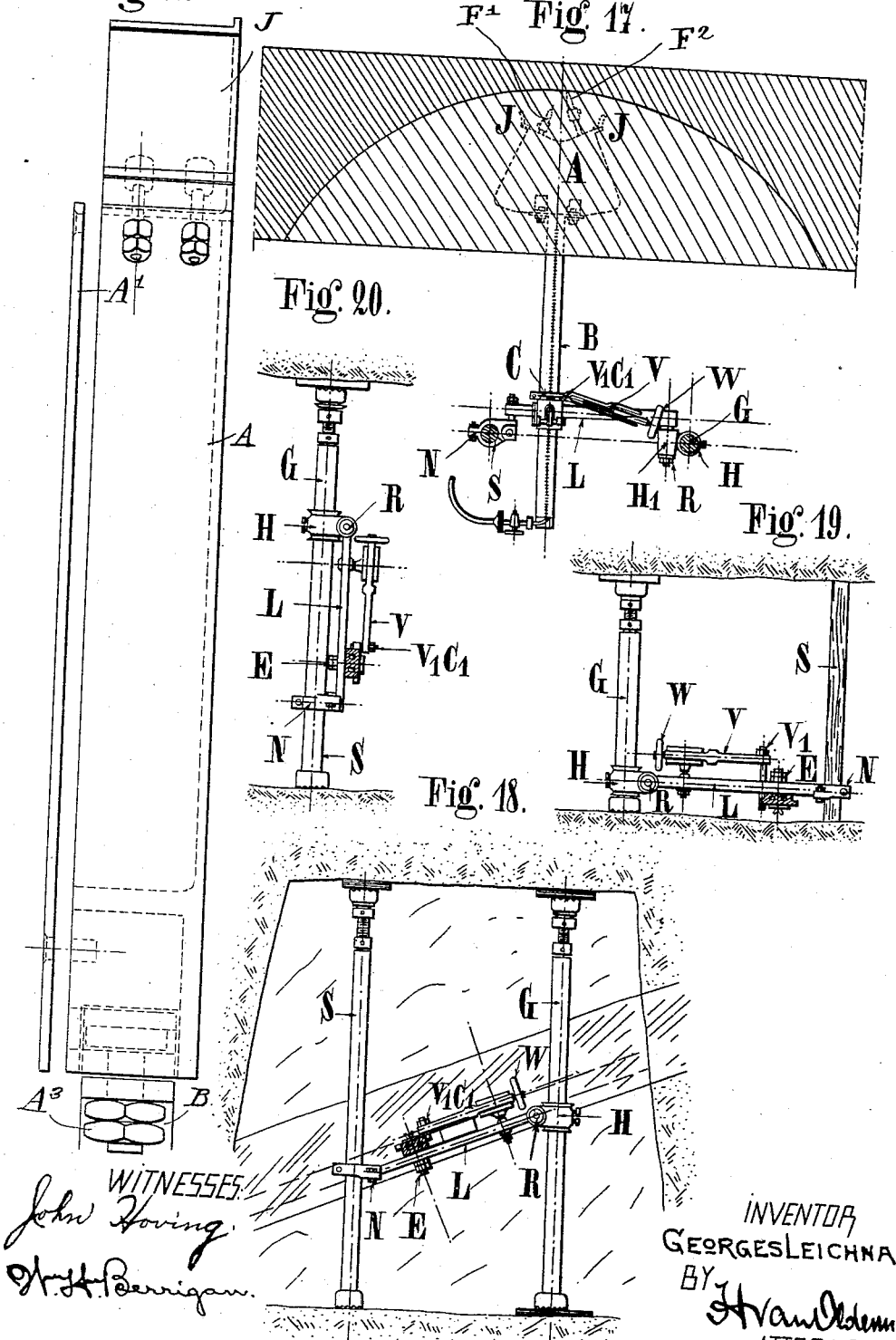

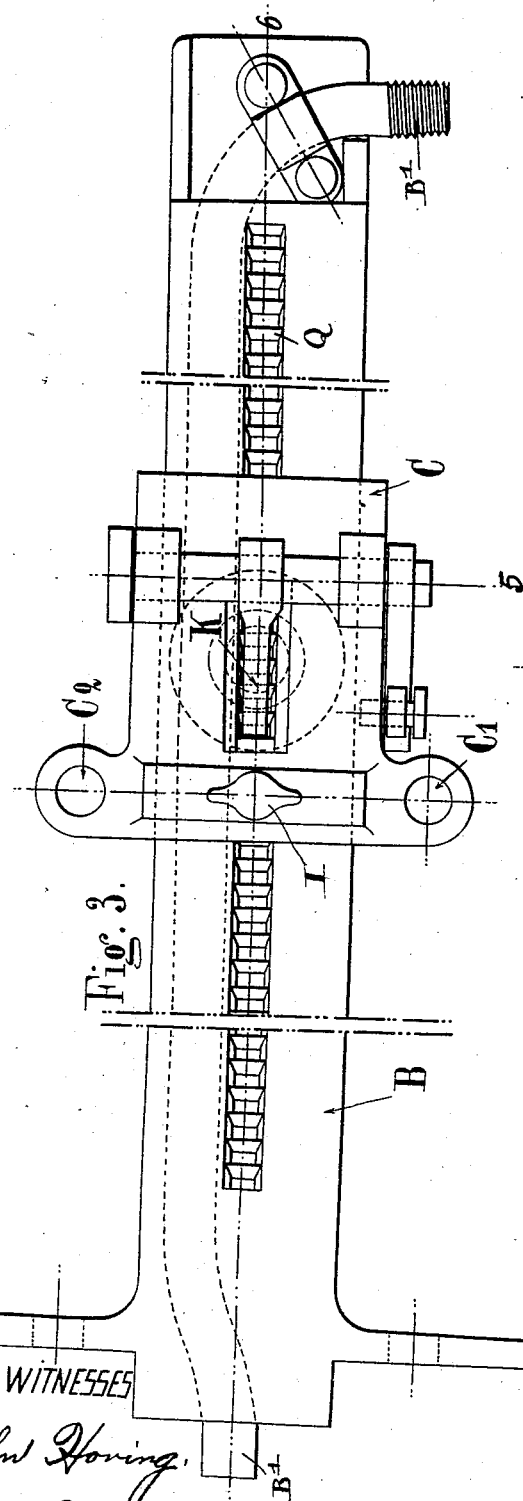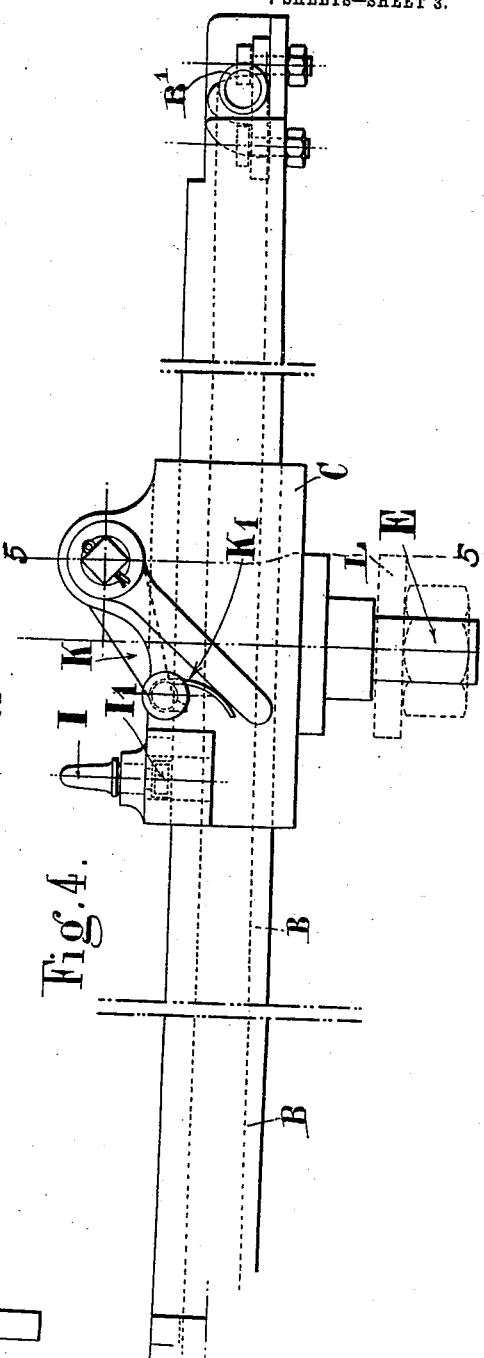

904,623.

Patented Nov. 24, 1908.
7 SHEETS—SHEET 4.

WITNESSES:
John Hoving.
W. H. Berrigan.

INVENTOR
Georges Leichnam.
BY
H. van Oldenneel
ATTORNEY

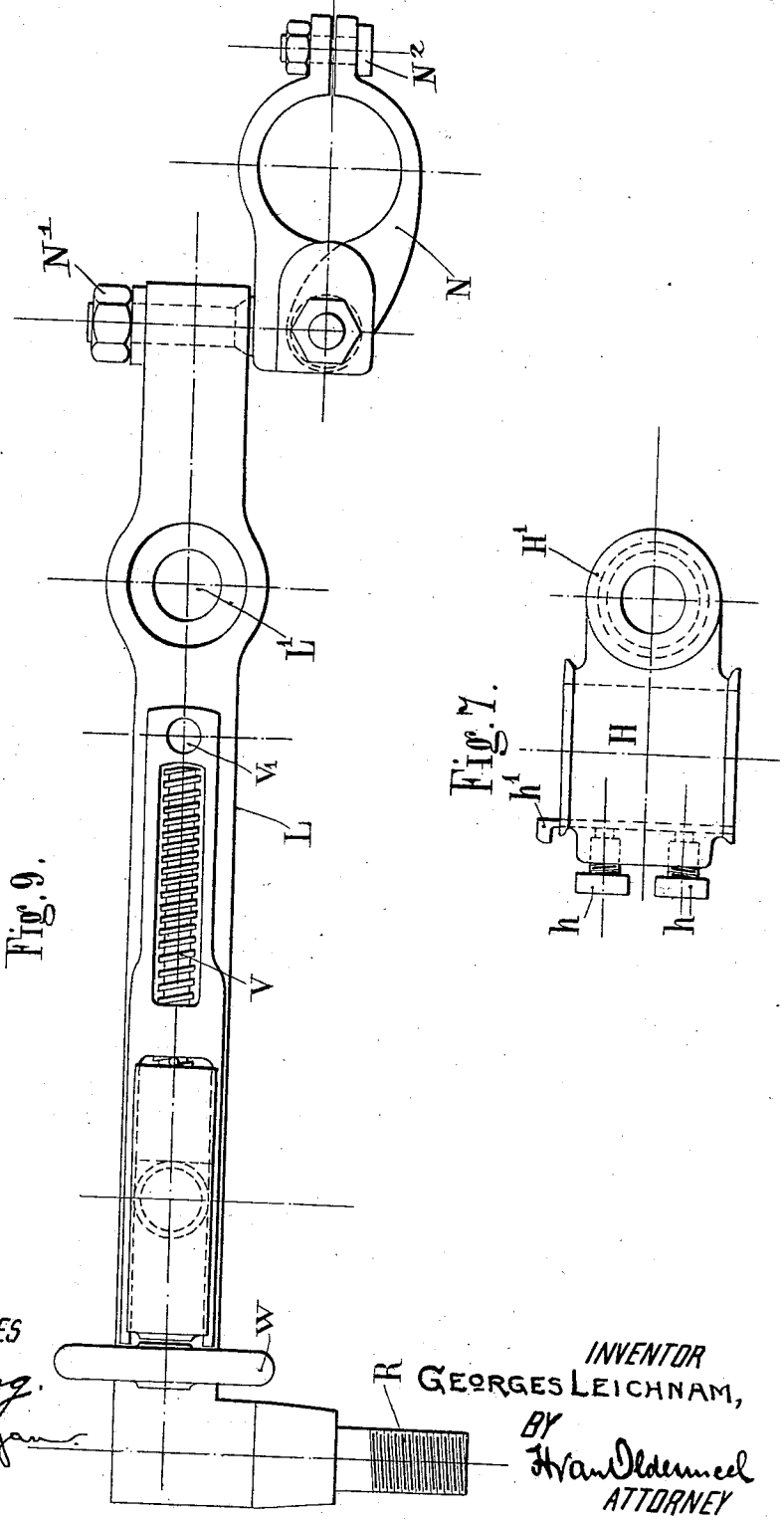

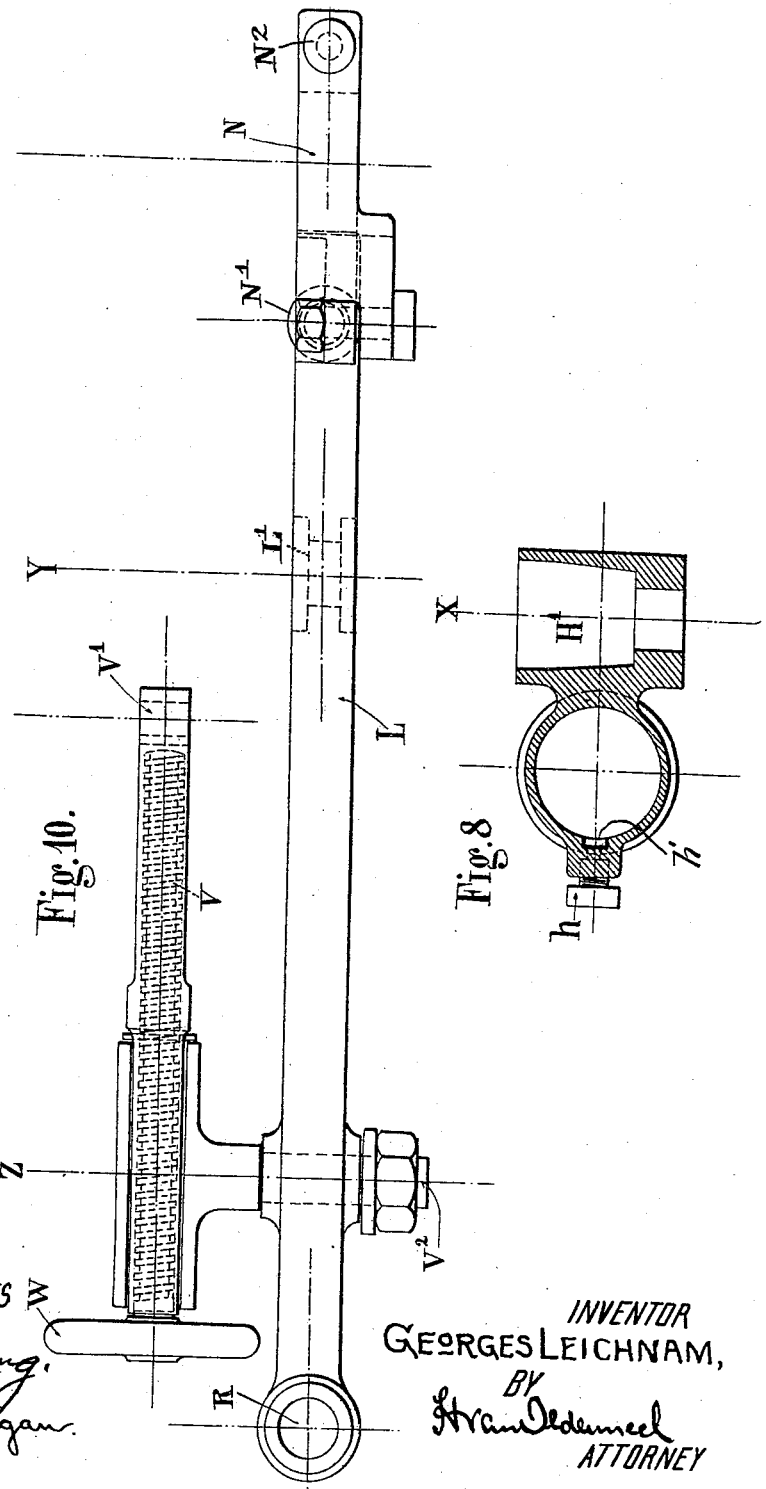

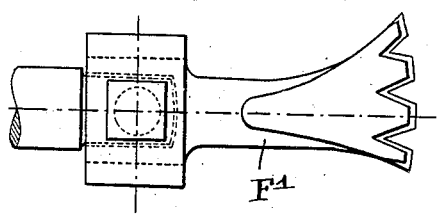
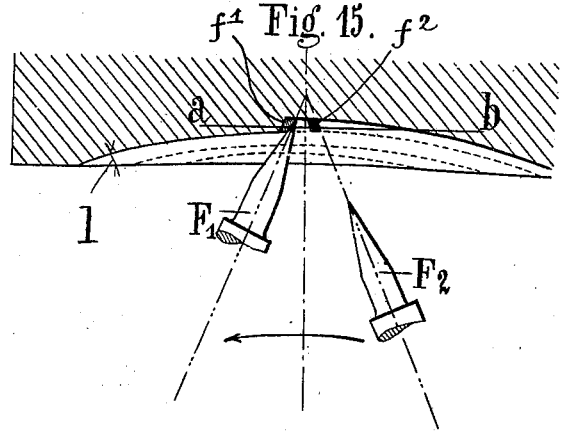
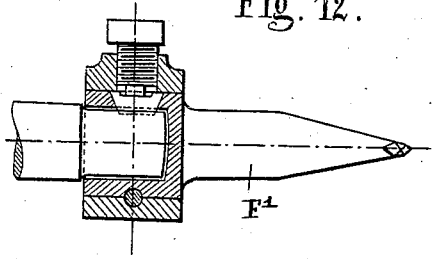
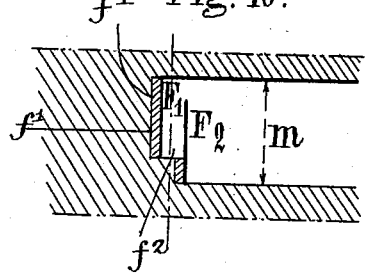
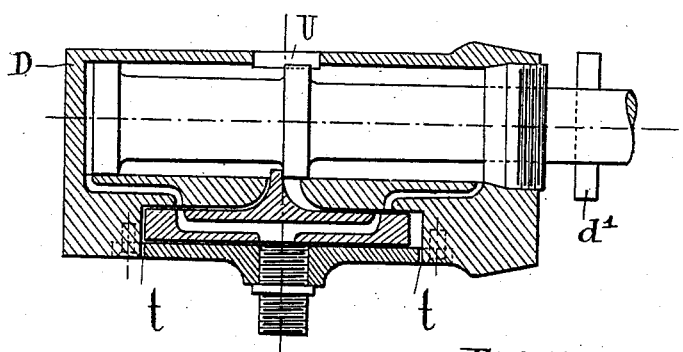
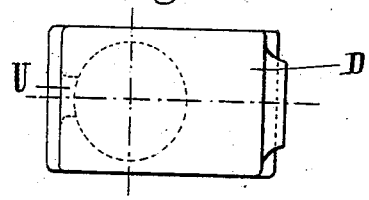

UNITED STATES PATENT OFFICE.

GEORGES LEICHNAM, OF DENAIN, FRANCE.

COAL-CUTTING MACHINE.

No. 904,623.  Specification of Letters Patent.  Patented Nov. 24, 1908.

Application filed June 14, 1906. Serial No. 321,736.

*To all whom it may concern:*

Be it known that I, GEORGES LEICHNAM, a citizen of the Republic of France, and resident of Denain, France, have invented a new and useful Improvement in or Relating to Coal-Cutting Machines, which improvement is fully set forth in the following specification.

This invention relates to coal cutting machines with double cutting picks, for cutting coals, ore, etc.

The invention improves to a considerable extent the capacity of percussion motors in the washing operation, permits the use of such motors in a greater number of mines, and is carried out in a simpler manner than with the existing motors.

In order to make the explanations as clear as possible, the accompanying drawings show, by way of example, a construction of a coal cutting machine according to this invention.

Figure 6:
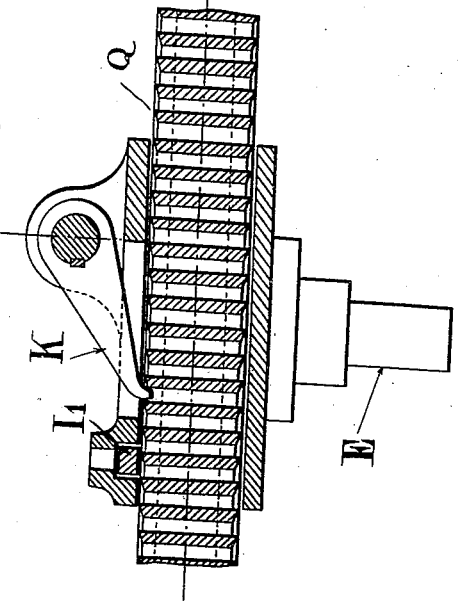
Figure 5:
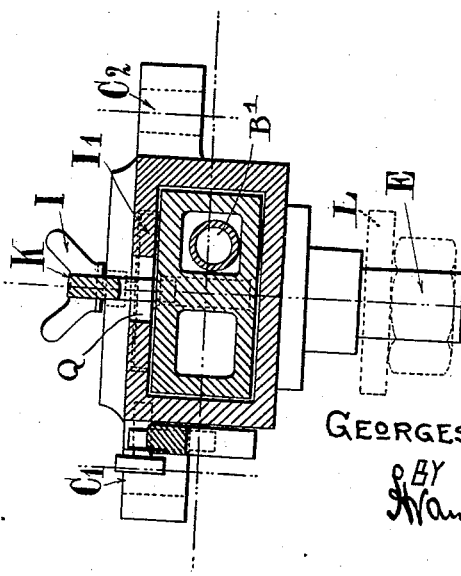

Figure 1 is a plan of the cutting apparatus with the cover removed; Fig. 2 is a side elevation; Figs. 3 and 4 are, respectively, a plan and an elevation of the cutting apparatus supporting the frame; Fig. 5 is a cross-section on the line 5—5 of Fig. 4; Fig. 6 is a longitudinal section (on the line 6—6 of Fig. 3) of a portion of the frame. Figs. 7 and 8 illustrate a detail of the device for securing the machine to a supporting column. Figs. 9 and 10 are, respectively, a plan and an elevation of a bracket arm; Figs. 11 and 12 illustrate a cutting tool in elevation and section; Figs. 13 and 14 show a cylinder of one of the engines; Figs. 15 and 16 are diagrammatic views of the work executed by the coal cutting machine; Figs. 17 to 20 are general views in plan and in elevation.

The coal cutting machine comprises:—

1. A flat box A, Figs. 1 and 2, made of steel and closed by a cover $A^1$, in the ribs of which are wedged by means of wedges $M^3$ two similar motors $M^1$ $M^2$. The axes of said motors are in the same plane, placed symmetrically on each side of the central axis of the box, inclined towards each other. They have a reciprocating motion and work with direct blows without rotation, and are provided with short and light drills $F^1$ $F^2$ similarly constructed. Each drill has a single cutting edge formed with teeth unevenly distributed relatively to the longitudinal axis of the drill, as shown in Figs. 11 and 12. The drills $F^1$, $F^2$ are secured on the pistons of the motors $M^1$, $M^2$, with the widest portion (that farthest from the longitudinal axis) of the cutting edge of one drill turned upwards and with the widest portion of the other drill turned downwards. The box A is provided in front with two angle irons J J (Fig. 1) on each side of the drills, leaving for these a free space and adapted to automatically direct backwards the dust produced by the work.

2. A frame in two parts B and C (Figs. 3 to 6) sliding one in the other. The long-shaped member B is rigidly secured on the frame A—Fig. 1—by means of bolts $A^3$. The same is made hollow and contains the pipe $B^1$, supplying compressed air or the electric wires.

In the apparatus illustrated, the member B is divided inside into two compartments, one of which contains the pipe $B^1$, the other serving for the exhaust. The rack-bar Q is provided in the central rib and is traversed by the tooth of a pawl K which is held applied by a spring $K^1$, (Figs. 3 and 4). The shifting is effected by hand. The member C carries a set-screw I enabling, by means of a key $I^1$, a suitable tightening always to be obtained. Two recesses $C^1$ and $C^2$ are formed in the part C to connect the same by means of a bolt $V^1$, (Figs. 9 and 10) with the shifting screw V of the bracket L on which the part C itself is secured by the bolt E, (Figs. 4, 5 and 6).

The apparatus is mounted on a carrier comprising:—

1. A column G (Figs. 17 to 19) carrying a collar H (Figs. 7 and 8) capable of moving upon it and of being secured at any point by set screws $h$ and a key $h^1$. The axis X of the socket $H^1$ carried by the collar is normal to the column, and the recess of $H^1$ is of conical shape.

2. A bracket-arm L (Figs. 9 and 10) constituted by a rigid bar in which is formed a socket or recess $L^1$ receiving the fixing bolt E of the part C, which freely rotates about the axis Y. This rotation is obtained by the changing screw V, (Fig. 9), hereinbefore referred to, operated by a hand wheel W, the guided nut of said screw being connected to C by a bolt at $V^1$, which is received in one of the recesses $C^1$ $C^2$. This screw is secured to the bracket-arm L by a bolt $V^2$ (Fig. 10) enabling it to rotate about the axis Z. At one of the ends of the bracket arm L there is a bolt R which is received in the conical recess H¹ of the collar-cup H. At the other end is pivoted by means of the bolt N¹ a collar N formed with two jaws which are clamped by means of the bolt N² onto a second column, or a post S, or onto the same column already carrying the collar H (Figs. 17, 18, 19 and 20).

Working. Figs. 17 to 20. The column G being fixed between the inclosing ground, and the collar cup H fixed at a suitable level, the bolt R is introduced into and strongly tightened in the conical recess of the cup H¹, the arm L being arranged in the direction of cutting desired. Then the collar N is tightened on a beam or on a second column S. By means of the attachment bolt E in the cup or recess L¹, the coal cutting machine is arranged above or below, according to circumstances. The screw V is secured to L with a sufficient play, above or below, by means of the bolt V² and connected by its nut to the casing by means of the bolt V¹ at C¹ or C².

The motors having been started, the attendant gives to the machine a circular movement, for instance, towards the left, by means of the hand wheel W acting on the screw V. The tools thus trace a circle and cut coal to a depth $l$ and height $m$ (Figs. 15 and 16). Having arrived at the end of its travel, the attendant advances the machine in the direction of its axis to the extent of $l$, then gives the whole machine a circular movement towards the right, and so on. During the movement towards the left (Figs. 15 and 16), the tool F¹, the wide portion of which is at the top, does the cutting proper on the total height of its cutting edge and cuts a slice $f^1$, at each blow, and the drill F², the wide portion of which is at the bottom, enlarges the cut downwards, by cutting a layer $f^2$ and removing the small pieces that F¹ might have accidentally omitted. During the movement towards the right, the same thing happens, only the parts are reversed. At each preliminary cutting, the angle irons J J arranged in front of the machine direct backwards the dust produced.

The machine or apparatus, illustrated by way of example in the accompanying drawing, is driven by compressed air. The motors are independent and suitably spaced so that their tools may not foul each other, and are inclined relatively to each other. The piston, (Fig. 14) is recessed to provide end rings or collars and at the end of its stroke, each operates directly upon the flat reciprocating double acting slide valve serving only for admission. The shocks against the bottoms of the valve chest are deadened by a cushion formed by the air at exhaust pressure which is contained therein, and which escapes through the narrow orifices $t$ of the cover. The exhaust takes place when the back or the front of the piston arrives at the orifice U arranged for that purpose in the wall of the cylinder at the side opposite the slide valve. The rotation of the drills is prevented by the keys D¹ D², which pass through the piston rods and rub against the frame of the machine.

The apparatus described is light; occupies very little space, and is easy to handle; it works methodically and uniformly and has simple and well protected motors. It can be used anywhere, cutting coal at any angle and any direction, at any level in the lode. It enables coal to be cut in passages only ten centimeters in height and does not require exceptionally solid ground.

Claims.

1. In a machine for cutting coal, a frame provided with a plurality of independently-operating cutting tools, a support, means for rotatably mounting said frame on said support, mechanism whereby said frame may be rotated, and two fixed supports and means whereby said support is adjustable upon the fixed supports.

2. In a coal cutting machine, two percussion motors each having a non-rotatable cutting drill, in combination with a box supporting both motors, a frame supporting said box and means for moving said box to cause the drills to move lengthwise of the trench and in the direction of the latter as cut, the cutting edge of each drill being formed with teeth on a plane perpendicular to the plane of the two motors, for the purpose of forming two different tracks of cutting and each cutting only a determined fraction of the total height of the definitive trench.

In testimony whereof I have signed this specification in the presence of two subscribing witnesses.

GEORGES LEICHNAM.

Witnesses:
 EMILE LEDRET,
 HANSON C. COXE.